Figure 1:
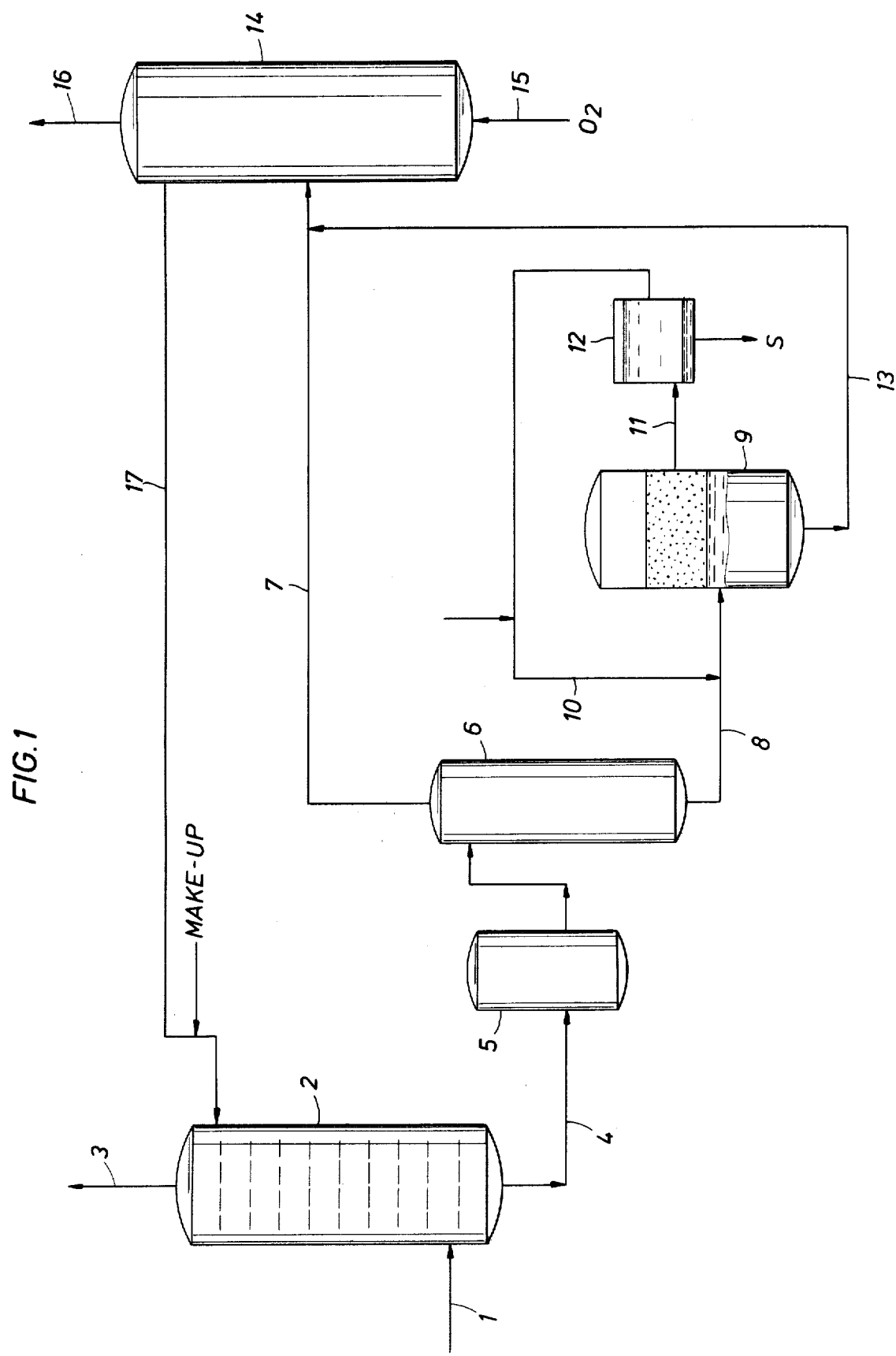

United States Patent [19]

Blytas

[11] 4,390,516
[45] Jun. 28, 1983

[54] SULFUR SEPARATION PROCESS

[75] Inventor: George C. Blytas, Houston, Tex.

[73] Assignee: Shell Oil Company, Houston, Tex.

[21] Appl. No.: 322,486

[22] Filed: Nov. 18, 1981

[51] Int. Cl.³ .................. C01B 17/04; B01D 53/34
[52] U.S. Cl. .............................. 423/573 R; 423/226
[58] Field of Search ............... 423/226, 228, 573, 578

[56] References Cited

U.S. PATENT DOCUMENTS 3,097,925  7/1963  Pitts et al. ........................ 423/573
4,243,648  1/1961  Fenton ............................. 423/573

FOREIGN PATENT DOCUMENTS 952502  3/1964  United Kingdom ............... 423/578

Primary Examiner—Earl C. Thomas
Attorney, Agent, or Firm—Albert J. Adamcik

[57] ABSTRACT

A cyclic process for the removal of $H_2S$ from gas streams is disclosed, the process being characterized by reaction of the $H_2S$ to sulfur employing polyvalent metal reactant solutions, and by a novel sulfur recovery scheme. Sulfur recovery, either before or after regeneration, is accomplished by separation of the sulfur-containing admixture into lean and concentrated solutions, and by extracting the concentrated solution with a compound having the formula $C_nH_{2n+1}OH$, wherein n is a number from 4 through 18.

12 Claims, 2 Drawing Figures

SULFUR SEPARATION PROCESS

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises an aqueous regenerable reactant, to produce solid free sulfur which is recovered either prior or subsequent to regeneration of the reactant. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

It has been found that the stability of some reactants employed is temperature dependent, i.e., if the temperature of the solutions is too high, some of the reactants tend to degrade or decompose. In particular, if temperatures above the melting point of sulfur are employed, some systems, such as particular iron chelate systems, tend to decompose.

On the other hand, if a solvent is employed to extract the sulfur from the solution, problems may arise if the solvent exhibits significant solubility in the gas treated. Thus, a need has existed for a gas treating system which would avoid the problems mentioned.

SUMMARY OF THE INVENTION

Accordingly, the invention relates to a process for the removal of $H_2S$ from gas streams in which the sulfur produced is concentrated to form a slurry of sulfur and reactant admixture or solution, and then removed as further described. More particularly, the invention, in one embodiment, relates to a process for the removal of $H_2S$ from a sour gaseous stream comprising: contacting the sour gaseous stream in a contacting zone with an aqueous reaction solution at a temperature below the melting point of sulfur, the mixture comprising an effective amount of an oxidizing reactant selected from the group consisting of oxidizing polyvalent metallic ions and oxidizing polyvalent metal chelate compounds, and mixtures thereof, to produce a sweet gas stream and an aqueous admixture containing sulfur and reduced reactant; removing aqueous admixture from the contacting zone; separating removed aqueous admixture into an aqueous reactant solution having reduced sulfur content and an aqueous reactant slurry containing increased sulfur content; regenerating aqueous reactant slurry in a regeneration zone to form aqueous admixture; concomitantly contacting aqueous reactant slurry in an extraction zone with a composition selected from compounds having the formula $C_nH_{2n+1}OH$, wherein n is a number from 4 through 18, and mixtures thereof, in an amount sufficient to remove at least the bulk of the sulfur from said slurry and form a separate phase containing sulfur and said composition, and forming a three phase mass comprising an upper phase containing solid sulfur and said composition, and a lower phase in contact with said upper phase, said lower phase comprising aqueous admixture containing reduced reactant; separating at least a portion of the upper phase, and recovering sulfur from the portion separated; separating aqueous admixture from the lower phase, and regenerating separated aqueous admixture in a regeneration zone to produce an aqueous admixture containing a regenerated reactant; and returning aqueous admixture from the regeneration zone to the contacting zone.

In another embodiment of the invention, the sulfur recovery is accomplished after regeneration of the reactant admixture or solution. More particularly, in this embodiment, the invention comprises a process for the recovery or removal of $H_2S$ from a sour gaseous stream comprising contacting the sour gaseous stream in a contacting zone with an aqueous reaction solution at a temperature below the melting point of sulfur, the mixture comprising an effective amount of an oxidizing reactant selected from the groups consisting of oxidizing polyvalent metallic ions and oxidizing polyvalent metal chelate compounds, and mixtures thereof, to produce a sweet gas stream and an aqueous admixture containing sulfur and reduced reactant; removing aqueous admixture from the contacting zone, and regenerating the aqueous admixture to produce a regenerated aqueous admixture containing a regenerated reactant and sulfur; separating the regenerated aqueous admixture into a regenerated aqueous reaction solution having reduced sulfur content and a regenerated aqueous reactant slurry containing increased sulfur content; contacting regenerated aqueous reactant slurry in an extraction zone with a composition selected from compounds having the formula $C_nH_{2n+1}OH$, wherein n is a whole number from 4 through 18, and mixtures thereof, in an amount sufficient to remove at least the bulk of the sulfur from said regenerated reactant slurry and form a separate phase containing sulfur and said composition, and forming a three phase mass comprising an upper phase containing solid sulfur and said composition, and a lower phase in contact with said upper phase, said lower phase comprising regenerated aqueous reaction solution; separating at least a portion of the upper phase, and recovering sulfur from the portion separated; separating regenerated aqueous reaction solution from the lower phase, and returning regenerated aqueous reaction solution from the regeneration zone to the contacting zone. In each embodiment, at least a portion of the upper phase separated is, preferably, returned to the extraction zone.

Accordingly, the invention substantially reduces the possibility of reactant degradation by extracting the sulfur from a limited volume of admixture. As indicated, the slurry is contacted with a composition selected from compounds having the formula $C_nH_{2n+1}OH$, wherein n is a whole number from 4 through 18, and mixtures thereof, in an extraction zone in an amount sufficient to remove at least the bulk of the sulfur from the aqueous slurry and form a separate phase containing sulfur and the compound. Accordingly, the invention provides for the formation of a three-phase mass containing, in the upper phase, solid sulfur and the compound or compounds mentioned, and a lower phase, in contact therewith, containing aqueous admixture. It has been found, surprisingly, that the compounds described exhibit the ability to extract the sulfur from the aqueous admixture. The upper phase, or a portion thereof, may then be removed, preferably continuously, and the sulfur recovered, e.g., by heating the solution and melting the sulfur to effect a separation. Concomitantly, in the first embodiment, the lower phase, or a portion thereof, may then be separated, again preferably continuously, and the reactant therein regenerated by contacting the admixture in a regeneration zone or zones with oxygen. The reactant admixture may be regenerated separately, or, preferably, is regenerated in the same regeneration zone as the main stream of admixture. In the second embodiment, the lower phase is preferably returned to the contacting zone. As used herein, the term "oxygen" includes oxygen-containing gases, air or air-enriched with oxygen. The oxygen oxidizes the reduced metal ions or the metal of the chelate or chelates to a higher valence state, and the regenerated mixture is returned to the contact zone. The oxygen (in whatever form supplied) is supplied in a stoichiometric equivalent or excess with respect to the amount of reactant present in the mixture. Preferably, the oxygen-containing gas is supplied in an amount of from about 1.2 to 3 times excess.

The particular type of gaseous stream treated is not critical, as will be evident to those skilled in the art. Streams particularly, suited to removal of $H_2S$ by the practice of the invention are, as indicated, naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. Obviously, the amount of $H_2S$ present is not generally a limiting factor in the practice of the invention.

The temperature employed in the contacting zone are not generally critical, except that the reaction is carried out at a temperature below the melting point of sulfur. In many commercial applications, such as the removal of $H_2S$ from natural gas to meet pipeline specifications, contacting at ambient temperatures is desired, since the cost of refrigeration would exceed the benefits obtained due to increased absorption at the lower temperature. In general, temperatures of from 10° C. to 80° C. are suitable, and temperatures from 20° C. to 45° C. are preferred. Contact times may range from about 1 second to about 270 seconds or longer, with contact times of 2 seconds to 120 seconds being preferred. Temperatures employed in the extraction zone will approximate those in the contacting zone, except that they will always be below the melting point of sulfur.

Similarly, in the regeneration or stripping zone or zones, temperatures may be varied widely. Preferably, the regeneration zone should be maintained at substantially the same temperature as the absorption zone. If heat is added to assist regeneration, cooling of the absorbent mixture is required before return of the absorbent mixture to the absorption zone. In general, temperatures of from about 10° C. to 80° C., preferably 20° C. to 45° C. may be employed.

Pressure conditions in the contacting or absorption zone may vary widely, depending on the pressure of the gas to be treated. For example, pressures in the contact zone may vary from one atmosphere up to one hundred fifty or even two hundred atmospheres. Pressures of from one atmosphere to about one hundred atmospheres are preferred. In the regeneration or desorption zone or zones, pressures may be varied considerably, and will preferably range from about 0.5 atmosphere to about three of four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251, to Meuly, issued Feb. 22, 1977, which disclosures are incorporated herein by reference. Preferably, if the iron chelate of nitrilotriacetic acid is used, pH in the process of the invention will range from about 6 to about 7.5, and the molar ratio of the nitrilotriacetic acid to the iron is from about 1.2 to 1.4. The procedure is preferably conducted continuously.

As indicated, the $H_2S$, when contacted, is quickly converted by the polyvalent metal ions, polyvalent metal chelate, etc., to elemental sulfur. The amount of polyvalent metal compound, polyvalent metal chelate, or mixtures thereof, supplied is an effective amount, i.e., an amount sufficient to convert all or substantially all of the $H_2S$ in the gas stream, and will generally be on the order of at least about one mol per mol of $H_2S$. Ratios of from about 1 or 2 mol to about 15 mols of polyvalent metal compound or chelate per mol of $H_2S$ may be used, with ratios of from about 2 mols per mol to about 5 mols of polyvalent metal compound or chelate per mol of $H_2S$ being preferred. The manner of preparing the aqueous solution or admixture is a matter of choice. The polyvalent metal ion or polyvalent metal chelate solution will generally be supplied as an aqueous solution having a concentration of from about 0.1 molar to about 2 molar, and a concentration of about 0.5 molar is preferred.

Any polyvalent metal can be used, but iron, copper and manganese are preferred, particularly iron. The polyvalent metal should be capable or oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin. The metals are normally supplied as a salt, oxide, hydroxide, etc.

Preferred reactant materials are coordination complexes in which polyvalent metals form chelates with an acid having the formula

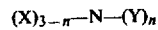

$(X)_{3-n}$—N—$(Y)_n$ wherein n is a whole number from 1 to 3; Y is an acetic acid or propionic acid group; X is 2-hydroxy ethyl, 2-hydroxy propyl, or an alkyl group having from one to four carbon atoms; or

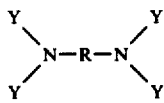

wherein:
from two to four of the groups Y are selected from acetic and propionic acid groups;
from zero to two of the groups Y are selected from 2-hydroxy ethyl and, 2-hydroxy propyl, and
R is ethylene, propylene or isopropylene or alternatively cyclohexane or benzene where the two hydrogen atoms replaced by nitrogen are in the 1,2 position; and mixtures thereof.

The polyvalent metal chelates are readily formed in aqueous solution by reaction of an appropriate salt, oxide or hydroxide of the polyvalent metal and the chelating agent in the acid form or an alkali metal or ammonium salt thereof. Exemplary chelating agents include amino acetic derived from ammonia or 2-hydroxy alkyl amines, such as glycine, diglycine (imino diacetic acid), NTA (nitrilotriacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylene-diamine-N,N-tetraacetic acid, and the amides of polyamino acetic acids disclosed in Bersworth U.S. Pat. No. 3,580,950. The iron chelates of NTA and 2-hydroxyethyl ethylene diamine triacetic acid are preferred.

A critical feature of the invention is the separation of the sulfur-containing admixture from the contacting zone (or from the regeneration zone) into two portions, a portion or stream having reduced sulfur content, and a portion or stream containing increased sulfur content, preferably a slurry. The manner of separation is a matter of choice, and equipment such as a hydroclone or a centrifugal separator may be employed. It is not necessary that absolutely all sulfur be removed on a continuous basis in the process; the process may suitably be operated with a very minor inventory or significantly reduced content of sulfur in the system. In general, whether the sulfur is separated prior to or after regeneration is a matter of choice, the important aspect being the contacting of the limited volume of the sulfur-containing admixture or "slurry" with the extractant. Preferably, the "slurry" or concentrated stream will comprise 2 percent to 30 percent, by volume, (on a continuous basis) of the total stream from the contact or regeneration zone.

As noted, compounds having the formula $C_nH_{2n+1}OH$, in which n is a whole number from 4 through 18, and mixtures thereof, may be used in extracting or removing the sulfur from the aqueous admixture or slurry. Useful compounds are t-butanol, n-pentanol, n-octanol, n-decanol, n-undecanol, n-dodecanol, and mixtures thereof. Preferably, the compounds employed are those wherein n is a whole number from 8 through 12, and mixtures thereof. The compound or compounds are supplied in an amount sufficient to remove at least the bulk of the sulfur from the slurry or admixture and form a separate phase comprising sulfur and the compound or mixture of compounds. Because the amount of the compound, or mixture of compounds, required is dependent on the amount of sulfur produced, which is, in turn, dependent on the concentration of $H_2S$ in the gas stream treated, precise amounts of the compounds cannot be given. Those skilled in the art may adjust the amount, as required. In general, the amount will range from about 1.0 percent to about 400 percent (by volume, based on the volume of the polyvalent metal or polyvalent metal chelate solution in contact therewith), with an amount of 5.0 percent to about 120 percent by volume being preferred. The solid sulfur apparently is suspended preferentially in the compound, or mixture of compounds, and may be recovered easily. The manner of recovering the sulfur is a matter of choice. For example, after separating the suspension (or a portion thereof), the sulfur may be recovered by settling, filtration, or by suitable devices such as a hydroclone. Preferably, however, the sulfur is melted, allowing separation by the simple expedient of allowing the sulfur to settle.

In order to describe the invention in greater detail, reference is made to the accompanying drawing. The values given herein relating to temperatures, pressures, compositions, etc., are calculated or merely exemplary and should not be taken as delimiting the invention.

Figure 2:
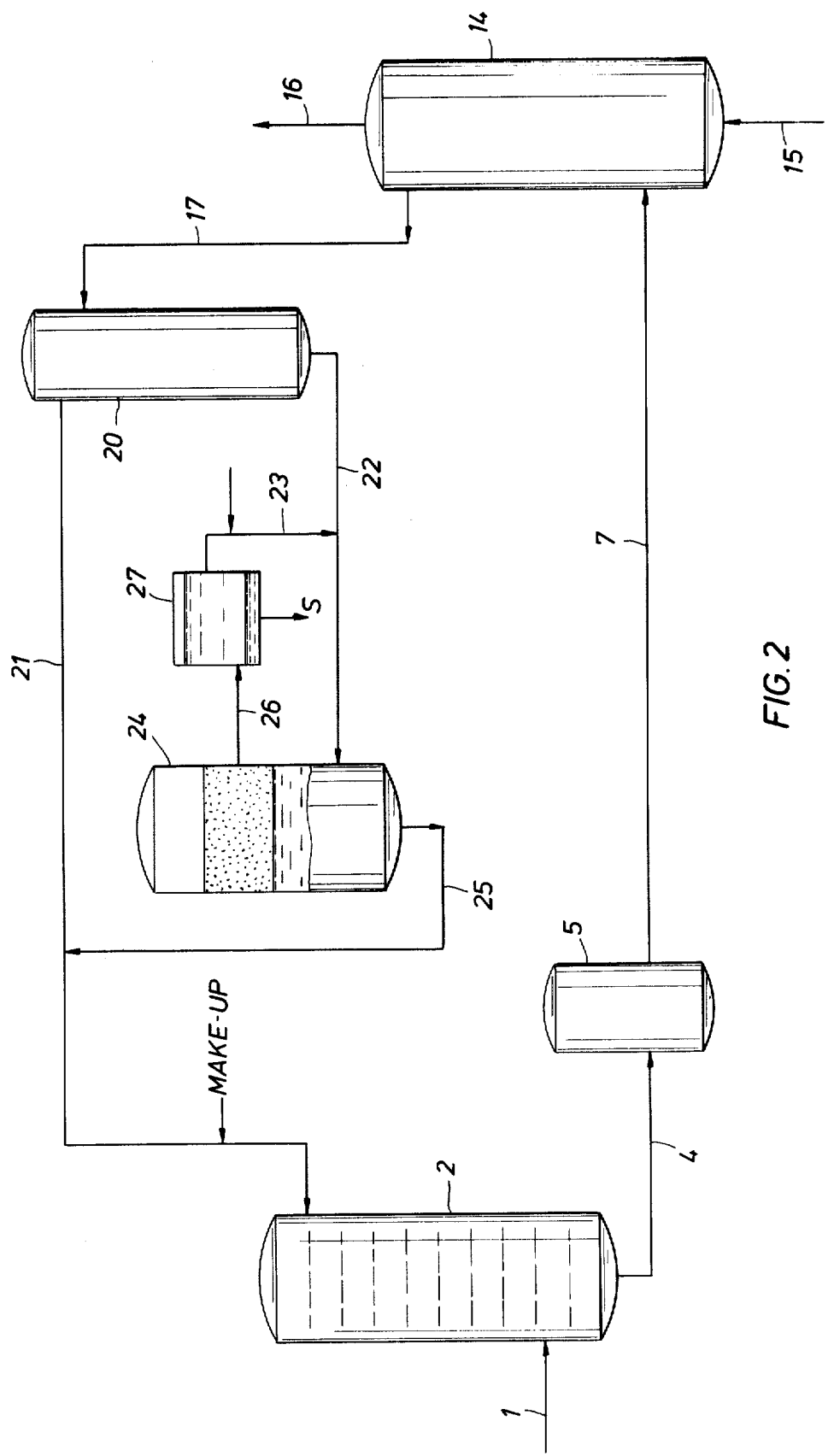

FIG. 1 illustrates the first embodiment of the invention, wherein sulfur is removed prior to regeneration, while FIG. 2 illustrates the second embodiment, i.e., removal of the sulfur after regeneration.

In FIG. 1, sour gas, e.g., natural gas containing about 0.5 percent $H_2S$, in line 1 enters contactor or column 2 (tray pipe) into which also enters an aqueous admixture comprising an aqueous 2.0 M solution of the Fe(III) chelate of nitrilotriacetic acid from line 17. The pressure of the feed gas is about 1200 p.s.i.g., and the temperature of the aqueous admixture is about 45° C. A contact time of about 120 seconds is employed in order to react all the $H_2S$. Purified or "sweet" gas leaves column 2 through line 3. The "sweet" gas is of a purity sufficient to meet standard requirements. In the admixture, the $H_2S$ is converted to elemental sulfur by the Fe(III) chelate, the Fe(III) chelate in the process being converted to the Fe(II) chelate. The aqueous admixture, containing the elemental sulfur, is removed continuously and sent through line 4 to a depressurization and degassing unit 5, and then to a separation zone. The separation zone 6 preferably comprises a unit, such as hydroclone 6, for separating the admixture into two portions, the major portion or stream having a reduced sulfur content (shown leaving in line 7), and a portion or stream having an increased sulfur content (shown leaving in line 8). It is not necessary that all sulfur be removed from the portion separated in line 7, and some sulfur retention may be beneficial. Preferably, the amount of sulfur removed in the hydroclone is simply balanced with the rate of sulfur intake in reactor 2, which is, of course, dependent on the amount of $H_2S$ in gas stream 1. Those skilled in the art may appropriately adjust the rates of withdrawal of streams 7 and 8. Typically, stream 8 comprises 10 percent by volume of the total volume of admixture in line 4.

Accordingly, the fluid slurry in line 8 proceeds to extraction zone 9. Prior to entry into unit 9, a stream of n-dodecanol in line 10 joins line 8 in such a fashion that good mixing of the aqueous admixture and the n-dodecanol occurs. The n-dodecanol may, of course, be added in unit 9, either wholly or in part, and the ratio of aqueous admixture to the n-dodecanol is approximately 1:1.

In unit 9, the n-dodecanol and aqueous admixture are allowed to separate into an upper n-dodecanol layer or phase, and a lower aqueous admixture layer. Surprisingly, even though sulfur normally has a density greater than 1.0, the sulfur may be said to "float" in the n-decanol, and is easily separated from the aqueous admixture. Large depths of a sulfur-rich zone in alcohol can be built without sulfur sinking through the aqueous-alcohol phase interface. This considerably facilitates design of the process equipment. The n-dodecanol-sulfur mixture is removed from separator 9 via line 11 to a recovery zone or tank 12, where the sulfur may be removed by warming the mixture to the melting point of sulfur. Optionally, only a portion of the upper phase may be removed, a "clarified" portion being separable and recyclable, so that only a portion of the upper phase need be heated. In any event, upon melting, as shown, the sulfur sinks to the bottom of tank 12 from whence it is easily removed. The n-dodecanol is removed via line 10, and is reused. Excess heat in the solvent may be removed, preferably in 9 or 13, as desired. The lower aqueous layer in unit 9 is removed via line 13.

Concomitantly, as noted, the aqueous admixture is removed from unit 6 via line 7 for regeneration of the Fe(II) chelate. As shown, the lower aqueous layer in line 13 joins line 7 prior to entry into regeneration zone 14, although separate entry into unit 14 is entirely feasible. In regeneration zone or column 14 the admixture is contacted with excess air in line 15 to convert the Fe(II) chelate to the Fe(III) chelate. The temperature of the regeneration column is about 45° C., and pressure in the column is maintained at about 2 atmospheres. Spent air is removed from column 14 through line 16, while regenerated aqueous admixture is returned via line 17 to contactor 2.

As indicated, FIG. 1 illustrates the aspect of the invention wherein the extraction is carried out prior to regeneration. Removal of the sulfur after regeneration may be preferred in some instances, and may be accomplished by positioning or the extraction unit "unit" the regeneration zone. Thus, regenerated liquid, still containing sulfur, may be passed via line 17 to units analogous or equivalent to units 6, 8 and 9, sulfur recovered, and regenerated sulfur-free solution returned to contactor 2.

Accordingly, in FIG. 2, the sulfur-containing liquid is passed, after degassing in 5, via line 7 to regenerator 14 where it is regenerated, as previously described. The regenerated sulfur containing admixture is removed via line 17, and passed to centrifugal separator 20 where it is separated into a regenerated reactant solution having reduced sulfur content and a sulfur-containing slurry. The regenerated reactant solution is returned via line 21 to contactor 2, while the slurry is removed, via line 22 to extraction zone 24. In extraction zone 24, the slurry is contacted, with n-decanol, as previously described, e.g., via line 23, and regenerated reactant solution is returned, via line 25 and 21, to contactor 2. Sulfur-containing decanol is removed via line 26, and may be treated to recover sulfur and decanol, in unit 27, as described in relation to FIG. 1.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate and sodium acetate, which may be beneficial.

What is claimed is:

1. A process for the removal of $H_2S$ from a sour gaseous stream comprising:

(a) contacting the sour gaseous stream in a contacting zone with an aqueous reaction solution at a temperature below the melting point of sulfur, the mixture comprising an effective amount of an oxidizing reactant selected from the group consisting of oxidizing polyvalent metallic ions and oxidizing polyvalent metal chelate compounds, and mixtures thereof, to produce a sweet gas stream and an aqueous admixture containing sulfur and reduced reactant;

(b) removing aqueous admixture from the contacting zone;

(c) separating removed aqueous admixture into an aqueous reactant solution having reduced sulfur content and an aqueous reactant slurry containing increased sulfur content; and regenerating aqueous reactant solution having reduced sulfur content producing regenerated reaction solution, and returning regenerated reaction solution to the contacting zone;

(d) concomitantly contacting aqueous reactant slurry in an extraction zone with a composition selected from compounds having the formula $C_nH_{2n+1}OH$, wherein n is a number from 4 through 18, and mixtures thereof, in an amount sufficient to remove at least the bulk of the sulfur from said slurry and form a separate phase containing sulfur and said composition, and forming a three phase mass comprising an upper phase containing solid sulfur and said composition, and a lower phase in contact with said upper phase, said lower phase comprising aqueous admixture containing reduced reactant;

(e) separating at least a portion of the upper phase, and recovering sulfur from the portion separated;

(f) separating aqueous admixture containing reduced reactant from the lower phase, and regenerating said separated aqueous admixture in a regeneration zone to produce an aqueous admixture containing a regenerated reactant;

(g) returning aqueous admixture from the regeneration zone to the contacting zone.

2. The process of claim 1 wherein at least a portion of the upper phase separated in step (e) is, after sulfur removal, returned to the extraction zone.

3. A process for the removal of $H_2S$ from a sour gaseous stream comprising:
   (a) contacting the sour gaseous stream in a contacting zone with an aqueous reaction solution at a temperature below the melting point of sulfur, the mixture comprising an effective amount of an oxidizing reactant selected from the groups consisting of oxidizing polyvalent matallic ions and polyvalent metal chelate compounds, and mixtures thereof, to produce a sweet gas stream and an aqueous admixture containing sulfur and reduced reactant;
   (b) removing aqueous admixture from the contacting zone, and regenerating the aqueous admixture to produce a regenerated aqueous admixture containing a regenerated reactant and sulfur;
   (c) separating the regenerated aqueous admixture into a regenerated aqueous reaction solution having reduced sulfur content and a regenerated aqueous reactant slurry containing increased sulfur content;
   (d) contacting regenerated aqueous reactant slurry in an extraction zone with a composition selected from compounds having the formula $C_nH_{2n+1}OH$, wherein n is a whole number from 4 through 18, and mixtures thereof, in an amount sufficient to remove at least the bulk of the sulfur from said regenerated reactant slurry and form a separate phase containing sulfur and said composition, and forming a three phase mass comprising an upper phase containing solid sulfur and said composition, and a lower phase in contact with said upper phase, said lower phase comprising regenerated aqueous reaction solution;
   (e) separating at least a portion of the upper phase, and recovering sulfur from the portion separated;
   (f) separating regenerated aqueous reaction solution from the lower phase, and returning regenerated aqueous reaction solution from the regeneration zone to the contacting zone.

4. The process of claim 3 wherein at least a portion of the upper phase separated in step (e) is, after sulfur removal, returned to the extraction zone.

5. The method of claim 1 wherein the oxidizing polyvalent metal chelate compound is the Fe(III) chelate of N-(2-hydroxyethyl)ethylenediamine triacetic acid.

6. The method of claim 1 wherein the oxidizing polyvalent metal chelate compound is the Fe(III) chelate of nitrilotriacetic acid.

7. The method of claim 2 wherein the oxidizing polyvalent metal chelate compound is the Fe(III) chelate of N-(2-hydroxyethyl)ethylenediamine triacetic acid.

8. The method of claim 2 wherein the oxidizing polyvalent metal chelate compound is the Fe(III) chelate of nitrilotriacetic acid.

9. The method of claim 3 wherein the oxidizing polyvalent metal chelate compound is the Fe(III) chelate of N-(2-hydroxyethyl)ethylenediamine triacetic acid.

10. The method of claim 3 wherein the oxidizing polyvalent metal chelate compound is the Fe(III) chelate of nitrilotriacetic acid.

11. The method of claim 4 wherein the oxidizing polyvalent metal chelate compound is the Fe(III) chelate of N-(2-hydroxyethyl)ethylenediamine triacetic acid.

12. The method of claim 4 wherein the oxidizing polyvalent metal chelate compound is the Fe(III) chelate of nitrilotriacetic acid.

* * * * *